(12) United States Patent
Greil

(10) Patent No.: US 6,827,371 B2
(45) Date of Patent: Dec. 7, 2004

(54) PASSENGER CAR HAVING A FUEL TANK MOUNTED BETWEEN THE VEHICLE SEATS AND METHOD OF MAKING AND USING SAME

(75) Inventor: Jurgen Greil, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/670,343

(22) Filed: Sep. 26, 2003

(65) Prior Publication Data

US 2004/0069551 A1 Apr. 15, 2004

Related U.S. Application Data

(63) Continuation of application No. PCT/EP02/02649, filed on Mar. 11, 2002.

(30) Foreign Application Priority Data

Mar. 31, 2001 (DE) .......................................... 101 16 268

(51) Int. Cl.$^7$ ................................................. B60P 3/22
(52) U.S. Cl. ..................................................... 280/834
(58) Field of Search ................................. 280/830–834; 180/69.4, 379, 220, 206; 296/193.07, 204

(56) References Cited

U.S. PATENT DOCUMENTS

| | | | | |
|---|---|---|---|---|
| 4,453,724 A | * | 6/1984 | Watanabe et al. ........... | 280/834 |
| 4,457,525 A | * | 7/1984 | Tanaka et al. .............. | 280/834 |
| 4,511,176 A | | 4/1985 | Watanabe et al. ........... | 296/204 |
| 4,545,589 A | * | 10/1985 | Watanabe et al. ........... | 280/834 |
| 4,550,923 A | * | 11/1985 | Ogawa et al. ............... | 280/834 |
| 5,658,013 A | * | 8/1997 | Bees et al. .................. | 280/831 |
| 5,975,625 A | * | 11/1999 | Simplicean .................. | 296/205 |
| 6,293,590 B1 | * | 9/2001 | Ogasa ......................... | 280/834 |

FOREIGN PATENT DOCUMENTS

| | | |
|---|---|---|
| DE | 114 561 | 8/1975 |
| DE | 198 41 331 A1 | 3/2000 |
| JP | 57201722 A | 12/1982 |
| JP | 57205225 A | 12/1982 |
| JP | 57205226 A | 12/1982 |
| JP | 57205227 A | 12/1982 |
| JP | 57205276 A | 12/1982 |
| JP | 58049519 A | 3/1983 |
| JP | 58049520 A | 3/1983 |
| JP | 58049521 A | 3/1983 |
| JP | 59153621 A | 9/1984 |
| JP | 01111526 A | 4/1989 |
| JP | 04368227 A | 12/1992 |
| JP | 08175203 A | 7/1996 |
| JP | 08244479 A | 9/1996 |
| JP | 2000085382 A | 3/2000 |

OTHER PUBLICATIONS

International Search Report dated Aug. 22, 2002.
German Search Report Mailed Dec. 16, 2003.

* cited by examiner

Primary Examiner—Lesley D. Morris
Assistant Examiner—Paul Royal, Jr.
(74) Attorney, Agent, or Firm—Crowell & Moring LLP

(57) ABSTRACT

A passenger car includes an engine that is mounted in the front end, from which a drive shaft leads to the rear wheels of the vehicle, and a fuel tank that is mounted between the vehicle seats and that extends in the longitudinal direction of the vehicle, the drive shaft running basically alongside the fuel tank from front to rear. An exhaust system of the engine, which is designed as an internal combustion engine, preferably runs from front to rear on the side of the fuel tank that is opposite the drive shaft. The fuel tank may be configured more narrowly in its top section than in its geodetically lower section and, in particular, have an approximately pear-shaped cross section and be designed to hold liquefied gas, especially liquid hydrogen. Preferably, the drive shaft of the vehicle engine runs in the vehicle longitudinal direction, and a gear reduction manual transmission that is provided between the engine and the drive shaft for the rear wheels is mounted on the side of the engine.

8 Claims, 2 Drawing Sheets

PASSENGER CAR HAVING A FUEL TANK MOUNTED BETWEEN THE VEHICLE SEATS AND METHOD OF MAKING AND USING SAME

BACKGROUND AND SUMMARY OF THE INVENTION

This application is a continuation of PCT International Application No. PCT/EP02/02649, filed Mar. 11, 2002, and claims priority based on German Patent Application No. DE 101 16 268.5 filed Mar. 31, 2001, the specifications of which are incorporated by reference herein.

The present invention relates to a passenger car having an engine that is mounted in the front end from which a drive shaft leads to the rear wheels of the vehicle and a fuel tank that is mounted between the vehicle seats and that extends in the longitudinal direction of the vehicle. For technical background, refer, for example, to German Patent Doc. 198 41 331 A1.

Typically, the fuel tank of a passenger car is mounted in the rear of the vehicle and, thus, is situated essentially in front of or above the rear axle of the vehicle, because this installation location has proven itself as an ideal compromise between safety and structural space considerations. This installation location is also selected today for the few known passenger cars that have a liquefied gas drive, that is, for passenger cars that use a liquefied gas, such as hydrogen. However, the tank volume of liquefied gas should be larger than that of conventional gasoline or diesel tanks in order to be able to offer the passenger car a comparable range between two refueling stops.

It is known from the aforementioned German Patent Doc. 198 41 331 A1 to mount the fuel tank in a passenger car above the drive shaft that leads to the rear wheels in a raised portion of the typical so-called center tunnel in order to create additional space in, for example, convertibles for the stowage of the top. However, even this known tank configuration offers practically no expanded tank volume compared to the previously typical configuration.

An aspect of the invention provides that the tank volume on a passenger car may be enlarged.

The achievement of this aspect may be realized in that the drive shaft runs basically alongside the fuel tank from front to rear. Advantageous designs and further developments are described in the dependent claims and herein. In them, it is expressly indicated that the concept of the invention is obviously not confined to liquefy gas tanks, but may also be used in tanks for conventional fuels produced from petroleum.

If, in accordance with certain preferred embodiments of the present invention, the drive shaft that leads from the engine in the front end to the rear axle of the passenger car alongside the tank, which is oriented in the longitudinal direction of the vehicle, a considerable amount of additional structural space is gained, in particular underneath, that is, towards the lane, which is then available for the configuration of the fuel tank. If, in a departure from the previously typical manner of design, the drive shaft is no longer in the center of the vehicle, but runs offset to the side from front to rear, then, even though it may be advisable to position the vehicle seats slightly higher than previously, this is unproblematic because there is sufficient structural space in elevation in a passenger vehicle. An exhaust system of the engine, which is designed as an internal combustion engine, may then run from front to rear along the side of the fuel tank that is opposite the drive shaft in an almost symmetrical disposition with respect to the longitudinal axis of the vehicle.

In order to best utilize the structural space that is available in terms of width, that is, in a plane running perpendicular to the driving direction and transverse to the vehicle, and thereby make available sufficient seating space, the fuel tank may be more narrowly configured in its upper section than in its geodetically lower section. The so-called "top section" of the fuel tank is thus located directly between the seats, which are mounted next to each other in the vehicle interior, while the so-called "lower section" may be situated basically beneath the vehicle seats. Thus, the fuel tank may have an approximately pear-shaped cross-section, which is especially advantageous from the standpoint of toughness, if the fuel tank is designed to hold liquefied gas, especially liquefied hydrogen. Finally, it may be advisable to permit an interior pressure of several bar for such a tank.

Also proposed is an advantageous disposition of a gear reduction manual transmission between the engine and the rear wheel drive shaft, which is advantageous with respect to both the utilization of structural space and the transmission of the torque of the vehicle engine to the vehicle rear axle.

Other objects, advantages and novel features of the present invention will become apparent from the following detailed description of the invention when considered in conjunction with the accompanying drawings.

DETAILED DESCRIPTION OF THE DRAWINGS

Figure 1:
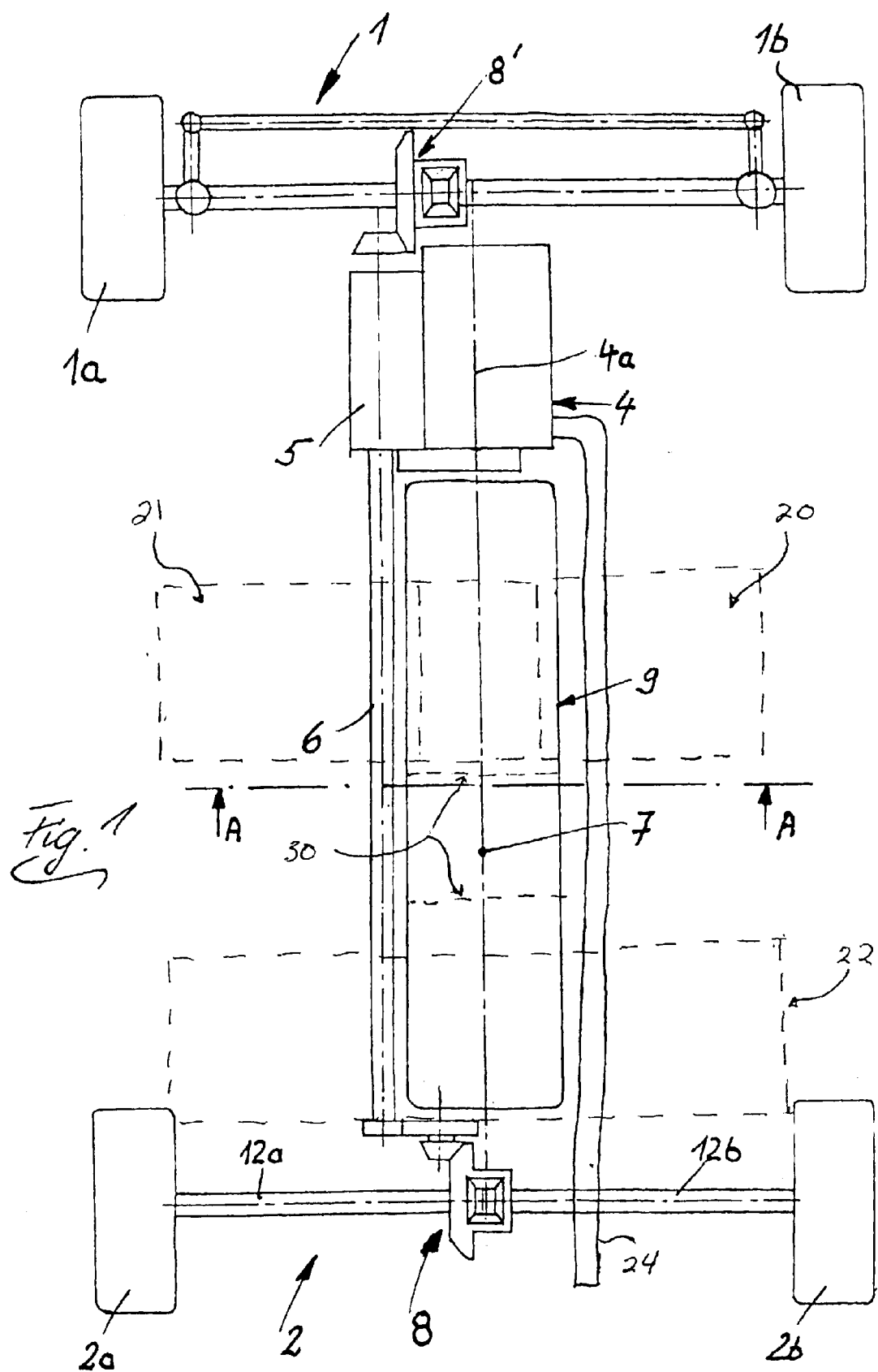
FIG. 1 shows the aspect of the base structure of a passenger car as per the present invention.
Figure 2:
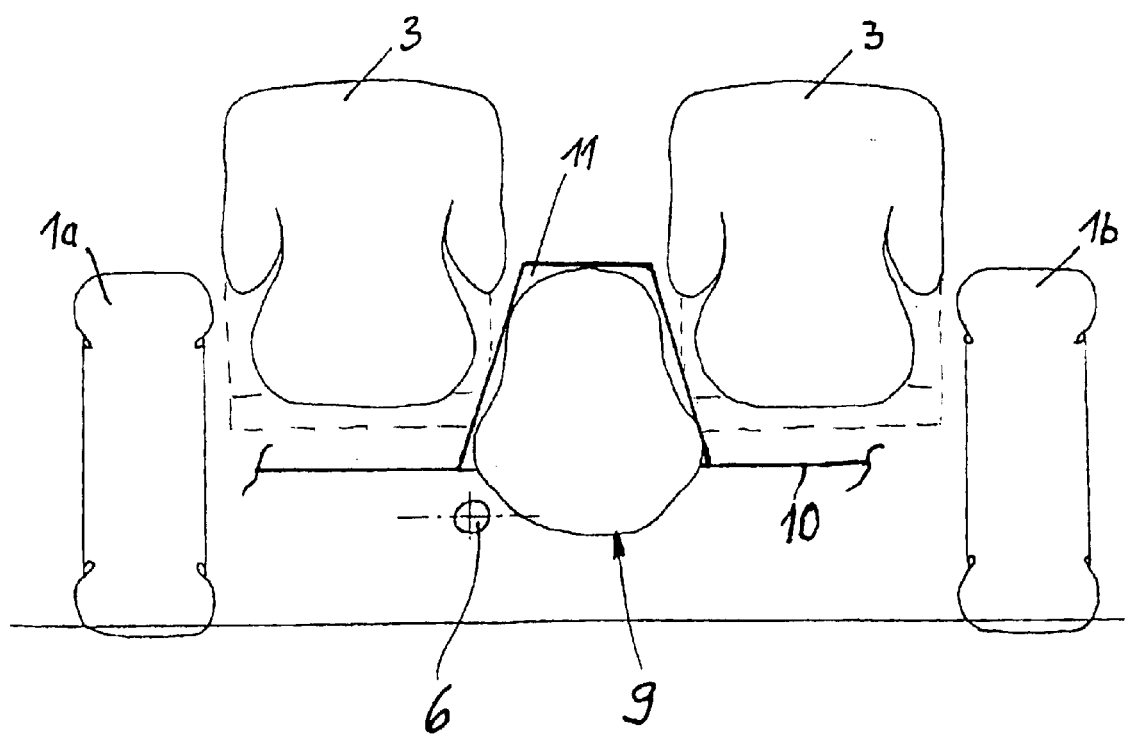
FIG. 2 shows a section A—A from FIG. 1.

Reference number 1 is used to designate the front axle, and reference number 2 is used to designate the rear axle of a passenger car (see FIG. 1) in whose interior two front seats 20, 21 and a rear bench seat 22 are provided in a typical manner. These vehicle seats are shown in FIGS. 1 and 2. One recognizes in FIG. 2 two very crudely abstracted seated vehicle occupants 3, who may be located either on the front seats 20, 21 or on the rear bench seat 22.

In FIG. 1, two front wheels 1a, 1b and two rear wheels 2a, 2b are provided, which are (or may be) driven by an engine 4, which is mounted in the front end. For this purpose, a drive shaft 6 that exits from a gear reduction manual transmission 5, which is mounted beside engine 4, runs in the longitudinal direction of the vehicle and is parallel to the vehicle center longitudinal axis 7 from front to rear to an intermediate gear 8 having an integrated differential, from which wheel driveshafts 12a and 12b lead to rear wheels 2a and 2b, respectively.

As is shown in this case—in a departure from the conventional known related art—drive shaft 6, which leads to the rear axle 2, does not run in the center of the vehicle, but is situated a rather considerable distance to the side of the vehicle central longitudinal axis 7. This produces structural space sufficient enough to mount a fuel tank 9 (to supply an engine 4) in center tunnel 11, which is provided as usual and fashioned out of floor plate 10 of the vehicle carriage. As FIG. 1 shows, this fuel tank 9 extends in the longitudinal direction of the vehicle basically from the rear side of engine 4 up to intermediate gear 8 in the area of rear axle 2.

In FIG. 2, the drive shaft 6 does not just run alongside fuel tank 9, but also basically close to the lower section of fuel tank 9. On the opposite (right) side, an exhaust system 24 of engine 4 may run symmetrically to drive shaft 6 with respect to the vehicle center axis 7 from front to rear. From FIG. 2, it is also shown that fuel tank 9 has an approximately pear-shaped cross-section, with a narrower top section and a wider bottom section.

In FIG. 1, the engine 4, which is designed, for example, as a reciprocating piston internal combustion engine of the in-line or V design type, is mounted within the engine compartment of the passenger vehicle in such a manner that the drive shaft of engine 4, which is represented by its axis 4a, runs parallel to the vehicle longitudinal axis and in this case is even covered by the vehicle central longitudinal axis 7. If the rear axle drive shaft 6, as shown, is supposed to run off-center next to centrally mounted fuel tank 9, it is especially advantageous, for minimization of intermediate gear reductions and shaft linkages, if gear reduction manual transmission 5 is mounted to the side of engine 4. In other respects, this system makes it possible in an especially simple way to also drive front wheels 2a, 2b of the passenger car and in particular by disposition of a front intermediate gear 8' having an integrated differential on the side of gear reduction manual transmission 5 that is opposite drive shaft 6.

With the described disposition of fuel tank 9 and rear drive shaft 6, which is situated next to it, a tank volume that is clearly enlarged compared to the previous design is made available on a passenger car that may be in all other respects conventional. This also results from the proposed shape of fuel tank 9 or its cross section being exceedingly advantageous, even regarding toughness aspects. In other respects, splash panels 30 (lying within a plane that is perpendicular to the driving direction) may be provided—also to increase the stability of tank 9—in the tank interior, just as a number of details, especially of a design nature, may generally be formulated that deviate entirely from the shown design example without abandoning the content of the patent claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A passenger vehicle comprising an engine that is longitudinally mounted in a front end of the vehicle, a gear reduction transmission provided between the engine and a drive shaft leading to rear vehicle wheels, and a fuel tank that is mounted between vehicle seats and extends in a longitudinal direction of the vehicle, wherein the transmission is longitudinally mounted at a lateral side of the engine, and wherein the drive shaft runs longitudinally alongside the fuel tank and to a side of a longitudinal vertical center plane of the vehicle, from the transmission to the rear of the vehicle.

2. The passenger vehicle according to claim 1, wherein an exhaust system of the engine runs from front to rear on a side of the fuel tank opposite the drive shaft.

3. The passenger vehicle according to claim 1, wherein the fuel tank is designed more narrowly in a top section than in a geodetically lower section.

4. The passenger vehicle according to claim 2, wherein the fuel tank is designed more narrowly in a top section than in a geodetically lower section.

5. The passenger vehicle according to claim 3, wherein the fuel tank has an approximately pear-shaped cross section and is designed to hold liquefied gas.

6. A method of making a passenger vehicle with an engine comprising the steps of:

providing an engine longitudinally mounted in a front end of the vehicle;

locating a gear reduction transmission longitudinally at a lateral side of the engine;

locating a fuel tank between vehicle seats and extending in a longitudinal direction of the vehicle;

provided a drive shaft leading from the transmission to rear vehicle wheels and running longitudinally alongside the fuel tank and to a side of a longitudinal vertical center plane of the vehicle.

7. A vehicle comprising:

an engine being longitudinally mounted in a front of the vehicle;

a gear reduction transmission located longitudinally at a lateral side of the engine;

a drive shaft leading from the transmission to rear wheels; and a fuel tank being mounted between vehicle seats and extending in a longitudinal direction of the vehicle, wherein the drive shaft extends longitudinally at a lateral side of the fuel tank and to a side of a longitudinal vertical center plane of the vehicle.

8. A vehicle according to claim 7, wherein an exhaust system extends from the engine to a rear of the vehicle on a side of the fuel tank opposite to the drive shaft.

* * * * *